United States Patent [19]

Lin

[11] Patent Number: 4,773,162

[45] Date of Patent: Sep. 27, 1988

[54] MINI ELECTRIC INKING BOX

[76] Inventor: Huei-Yang Lin, 6, Tongchuan Rd., Shinghua Lee, Erlin Town, Changhua Hsien, Taiwan

[21] Appl. No.: 41,212

[22] Filed: Apr. 22, 1987

[51] Int. Cl.4 .......... G01B 3/02

[52] U.S. Cl. .......... 33/414; 33/138

[58] Field of Search .......... 33/137, 138, 139, 140, 33/413, 414, 248.2

[56] References Cited

U.S. PATENT DOCUMENTS

| | | | |
|---|---|---|---|
| 88,212 | 3/1869 | Richardson | 33/414 |
| 526,937 | 10/1894 | Neff | 33/414 |
| 1,373,884 | 4/1921 | Gregory | 33/414 |
| 4,189,107 | 2/1980 | Quenot | 33/138 X |
| 4,580,347 | 4/1986 | McKnight | 33/138 |

FOREIGN PATENT DOCUMENTS

| | | | |
|---|---|---|---|
| 1446379 | 6/1966 | France | 33/138 |

*Primary Examiner*—Harry N. Haroian

*Attorney, Agent, or Firm*—Holman & Stern

[57] ABSTRACT

A type of mini electric inking box in which a small motor transmit drive through a gear set to a thread wheel, while the thread on the thread wheel is placed inside the ink box with a sponge and extended outwards, inside the box body is a detachable cover and a battery compartment, at the front is a lamp.

3 Claims, 4 Drawing Sheets

MINI ELECTRIC INKING BOX

BRIEF SUMMARY OF THE INVENTION

The subject invention relates to a mini electric inking box,comprising a box in which is a small motor transmitting through a set of gearing to a thread rotating wheel, the thread extending from the thread rotating wheel through a hermetically sealed inking box, inside the inking box is a sponge, one end of the thread is tied to a fixing rod, inside the box is also a UM3 battery compartment, on its front is a lamp, at the side of box is a lamp switch and a motor switch, one side of the box body is detachable to facilitate replacement of battery or manual winding of thread axile.

BRIEF DESCRIPTION OF THE DRAWINGS

Drawings

1. Exploded view of the subject invention.
2. Sectional view of the subject invention.
3. Front perspective view of the subject invention.
4. Rear perspective view of the subject invention.

Illustration of Parts

Figure 1:
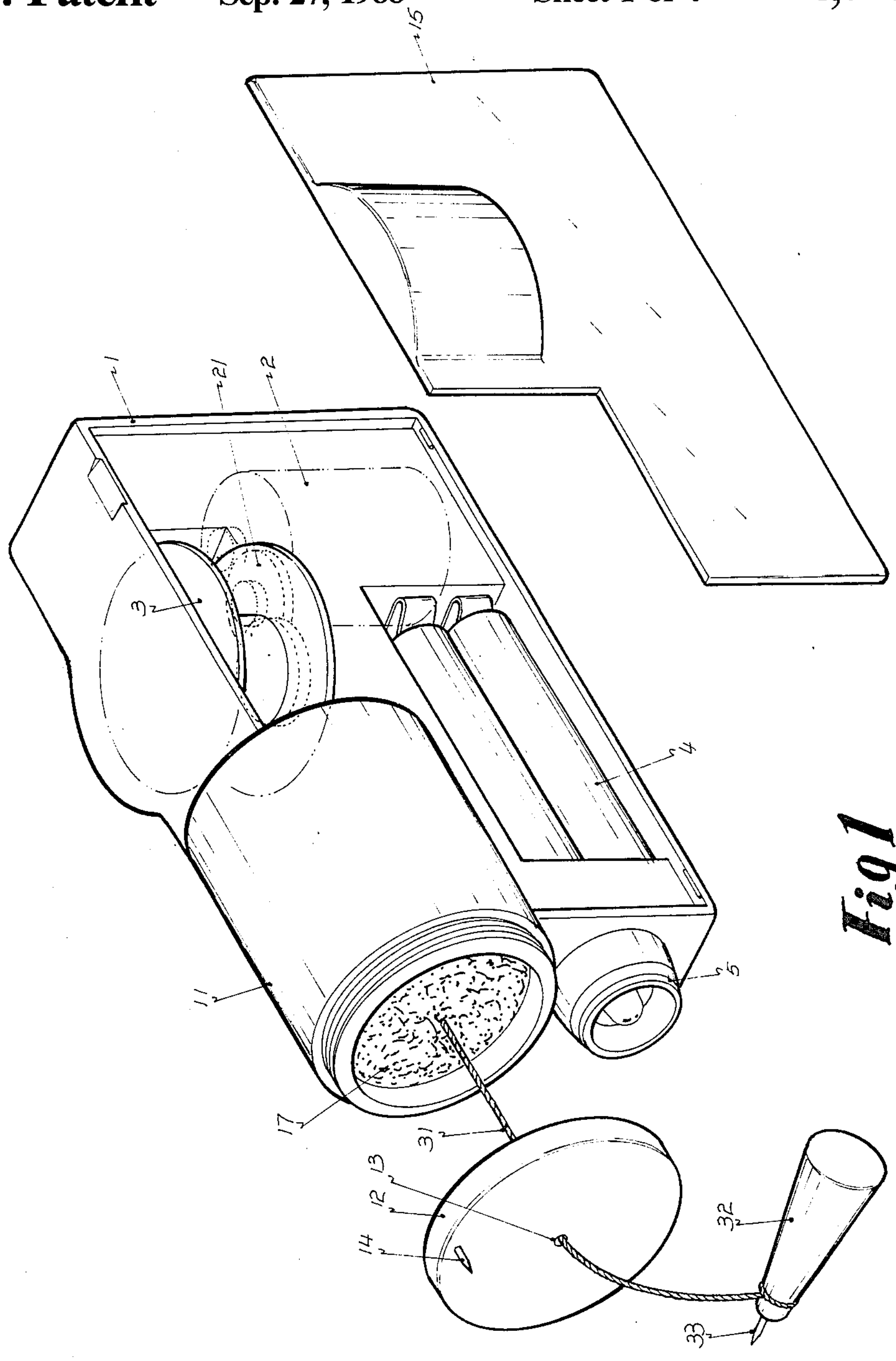
Figure 2:
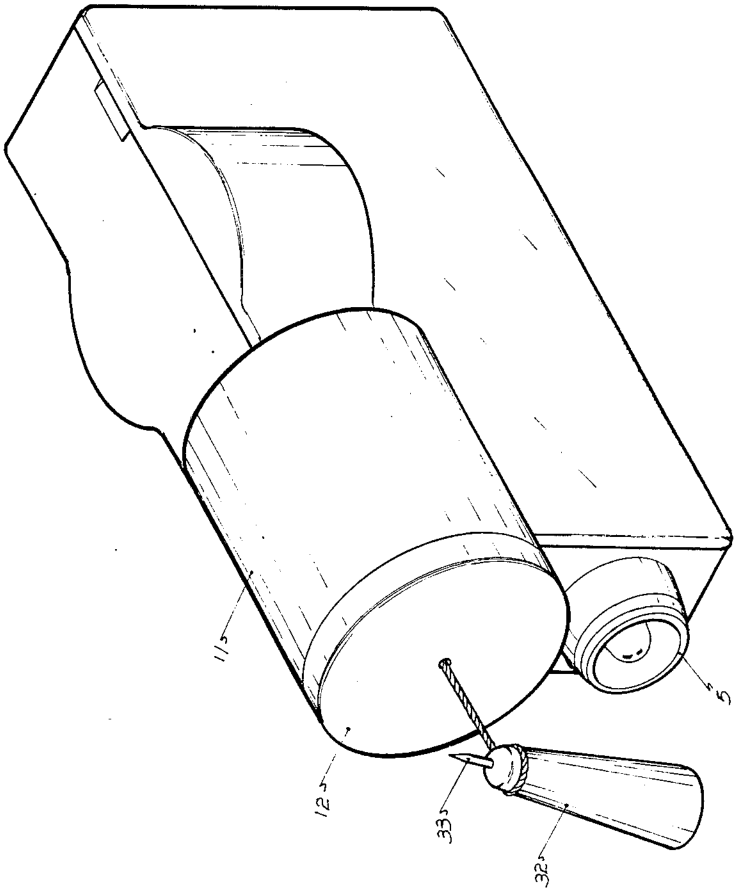
Figure 3:
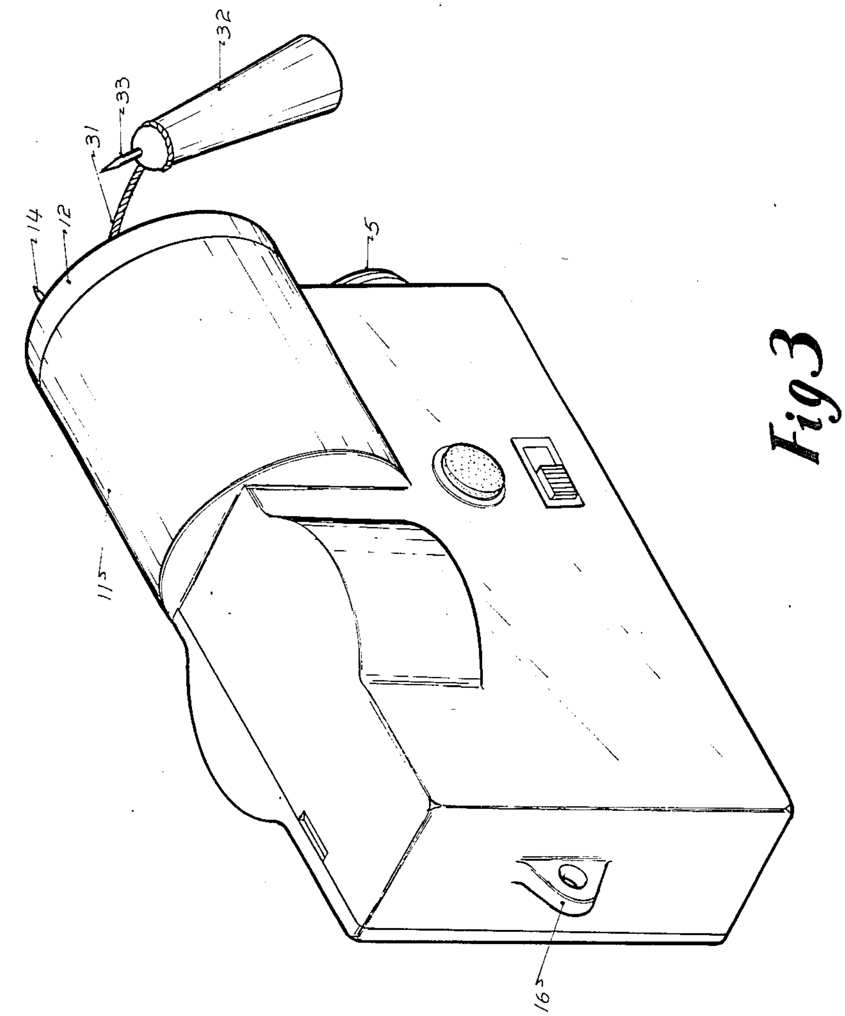
Figure 4:
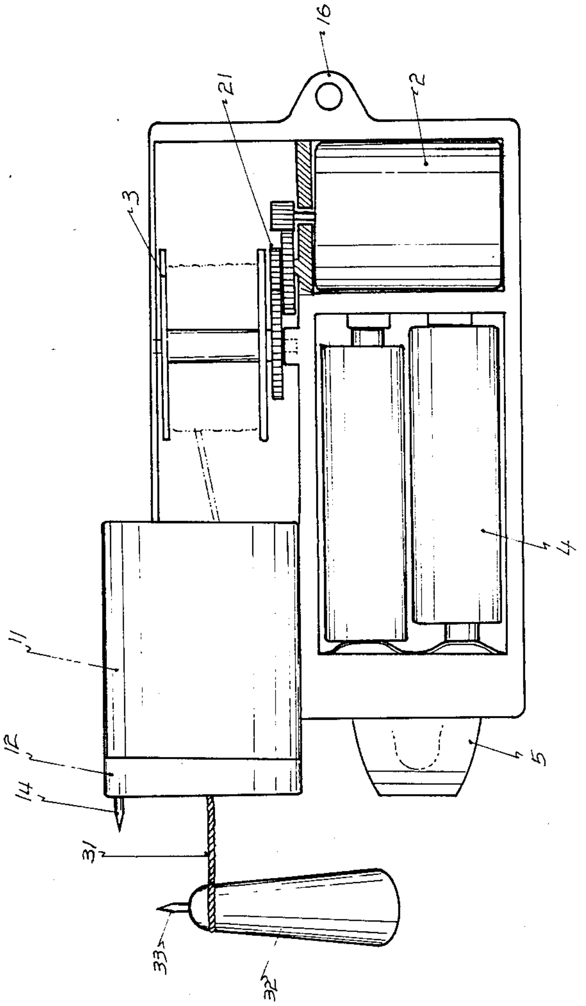

| | | |
|---|---|---|
| 1. Box body | 13. Small opening | 14. Fixing bolt |
| 12. Outside cover | 11. Ink container | 21. Gear set |
| 15. Side cover | 2. Small motor | 32. Fixing rod |
| 3. Thread wheel | 31. Thread | |
| 4. UM3 battery | | |
| 5. Lamp | | |

DETAILED DESCRIPTION

Ink boxes generally used to mark lines in construction projects such as carpentry, paintwork and plumbing, but conventional ink boxes normally involve a box supporting a manual turning thread wheel while the thread will be stained by the ink to mark lines. Generally, person hold the inked thread at a fixed point while another hold the other end at another fixed point to mark the stright line, then, one holding the inking box will turn the thread wheel to recover the thread for the mext operation. So, it requires two operators. And, if the operation is at a higher location, it could cause trouble. Or in indoor operation where there is poor illumination(especially newly constructed buildings without electricity supply), the operators would have to light a torch to find the accurate locations. But generally, operators are not used to carry a torchlight with them, so the operation could be some trouble. Moreover, manual rewinding of thread costs too much trouble and time and stains on hands. And, conventional inking boxes are in bigger sizes and not convenient to carry. The conventional inking body is located outside exposure, so the ink will easy and needs frequency refill or overturn of the box to stain our hands or the operation surface. In view of the above weaknesses, the inventor of the subject invention has developed the subject invention. Explanation of the composition of the subject invention as follows:

As shown in drawing 1 and drawing 2, the main construction of the subject invention features the box body, in which is a small motor(2) transmitting through the gear set (21) to a thread wheel (3), the diameter of the thread wheel (3) is slightly bigger than the width of the box body(1), one end of it slightly protruding from one side of the box body (1), on the thread wheel (3) is the thread(31) which passes through the ink container (11) at the front of the box bosy (1), at the front of the ink container (11) is an outer cover(12), the thread (31) passes through the small hole (13) on the outer cover(12), while the end of the thread (31) is tied to a fixed rod(32) which has a fixing bolt (33), on the flange of the outer cover(12) of the ink container is also a fixing bolt(34), in the box body is a compartment to accommodate UM3 battery (4), below the ink container is a lamp (5), on the side of the box body(1) is a lamp switch and a motor switch (drawing 4) for separate control of the lamp and motor, one side of the body (1) is a detachable side cover (15) to facilitate replacement of batteries or manual turning of the thread wheel (3).

Due to its compact size, the subject invention can be held by the operator, or attached with a hook outside the box body (1) to facilitate carrying purposes, one can fix the front end of the fixing rod (32) on a fixed point with the fixing bolt(33), then when the box body (1) is moved , the thread (31) be drawn out from the sponge in the ink container (11), and when reaching the fixed position, the fixing bolt (13) on the outer cover(12) will rewind on the thread (31), then the fixing bolt (13) is pushed against the fixed point, then use one hand to pull and impress the ink, to rewind one has only to depress the motor switch and the motor will recover the thread (31) rapidly by rotating the thread wheel (3). If the batteries are used out, one has to detach the side cover (14)to manually turn the thread wheel (3). The lamp equipped in the subject invention will provide illumination in case of poor lighting conditions. The outer cover (12) of the ink container(11) is fixed by a bolt with the ink container (11) to ready refill of ink.

Owing to the practability and features of the subject invention, this is a unique miniature electric inking box. And, according to our market survey, this product can be conveniently carried by individuals and so it will be widely accepted by the public.

What is claimed is:

1. An inking device for a marker line, comprising a hand-held casing having a front end, a back end and two sides, a marker line reel in the casing, a marker line on the reel, an ink reservoir in the casing for the marker line to be pulled through when unwound from the reel, a removable ink reservoir cover at the front end of the casing, an opening in the ink reservoir cover for the marker line to extend through, a first marker attached to a forward end of the marker line, a second marker on the ink reservoir cover, an electric light bulb socket at the front end of the casing adjacent the ink reservoir cover, electric drive means within the casing for rotating the reel to rewind the marker line thereon, a battery compartment in the casing for accommodating battery means to power a light bulb retained in said socket and to power said drive means, and a removable battery compartment cover.

2. An inking device as claimed in claim 1, wherein the drive means is an electric motor and gearne means.

3. An inking device as claimed in claim 1, wherein the battery compartment cover is located on one side of the casing.

* * * * *